United States Patent
Palik

(10) Patent No.: US 8,625,005 B2
(45) Date of Patent: Jan. 7, 2014

(54) FIRST-IN-FIRST-OUT (FIFO) BUFFERED MEDIAN SCENE NON-UNIFORMITY CORRECTION METHOD

(75) Inventor: Stephen M. Palik, Playa Vista, CA (US)

(73) Assignee: Raytheon Company, Waltham, MA (US)

(*) Notice: Subject to any disclaimer, the term of this patent is extended or adjusted under 35 U.S.C. 154(b) by 692 days.

(21) Appl. No.: 12/940,128

(22) Filed: Nov. 5, 2010

(65) Prior Publication Data
US 2012/0113299 A1    May 10, 2012

(51) Int. Cl.
*H04N 5/217* (2011.01)
*H04N 5/228* (2006.01)

(52) U.S. Cl.
USPC .................................. 348/241; 348/222.1

(58) Field of Classification Search
USPC ................. 348/222.1, 241; 345/545
See application file for complete search history.

(56) References Cited

U.S. PATENT DOCUMENTS

| | | | |
|---|---|---|---|
| 5,721,427 A | | 2/1998 | White et al. |
| 5,903,659 A * | | 5/1999 | Kilgore .................. 382/103 |
| 5,925,880 A * | | 7/1999 | Young et al. .............. 250/252.1 |
| 6,184,527 B1 | | 2/2001 | Young |
| 6,803,945 B1 * | | 10/2004 | Needham ................ 348/207.1 |
| 6,934,421 B2 * | | 8/2005 | Gindele et al. .............. 382/260 |
| 7,016,550 B2 * | | 3/2006 | Alderson et al. .............. 382/274 |
| 7,035,475 B1 * | | 4/2006 | Chen et al. ................ 382/254 |
| 7,280,596 B2 * | | 10/2007 | Cho ................. 375/240.12 |
| 2004/0017891 A1 * | | 1/2004 | Endo ................... 378/98.8 |
| 2004/0113052 A1 * | | 6/2004 | Johanneson et al. ...... 250/214 R |
| 2005/0157942 A1 * | | 7/2005 | Chen et al. .................. 382/275 |
| 2008/0151081 A1 * | | 6/2008 | Frank ................... 348/241 |
| 2008/0204592 A1 * | | 8/2008 | Jia et al. .................. 348/402.1 |
| 2010/0074554 A1 | | 3/2010 | Gyotoku |
| 2010/0188535 A1 * | | 7/2010 | Mitsuya et al. ............... 348/241 |

FOREIGN PATENT DOCUMENTS

| | | |
|---|---|---|
| EP | 2 015 562 A1 | 1/2009 |
| WO | 2002/067575 A2 | 8/2002 |
| WO | 2007/123453 A2 | 11/2007 |

OTHER PUBLICATIONS

Narendra; "Scene-based nonuniformity compensation for imaging sensors"; IEEE Trans Pattern Anal Mach Intell.; 4 (1):57-61 (1982)[Abstract only].

* cited by examiner

*Primary Examiner* — Roberto Velez
*Assistant Examiner* — Tuan Le
(74) *Attorney, Agent, or Firm* — Pierce Atwood LLP; Joseph M. Maraia

(57) ABSTRACT

A buffered scene-based non-uniformity correction method includes receiving a plurality of frames of video image data from an image detector; determining relative movement of a current image frame with respect to a previous image frame and responsive to a determination of substantial movement, adding the current image frame to a buffer memory sized to store a predetermined number of video frames; averaging pixel values of the frames in the buffer to determine a mean (or weighted mean) value for each pixel of a reference image; determining correction terms for each pixel of the current image frame by determining the difference between the current image frame pixel values and the corresponding reference image pixels; and correcting the current image frame using the correction terms. A scene-based non-uniformity correction system is also disclosed.

25 Claims, 11 Drawing Sheets

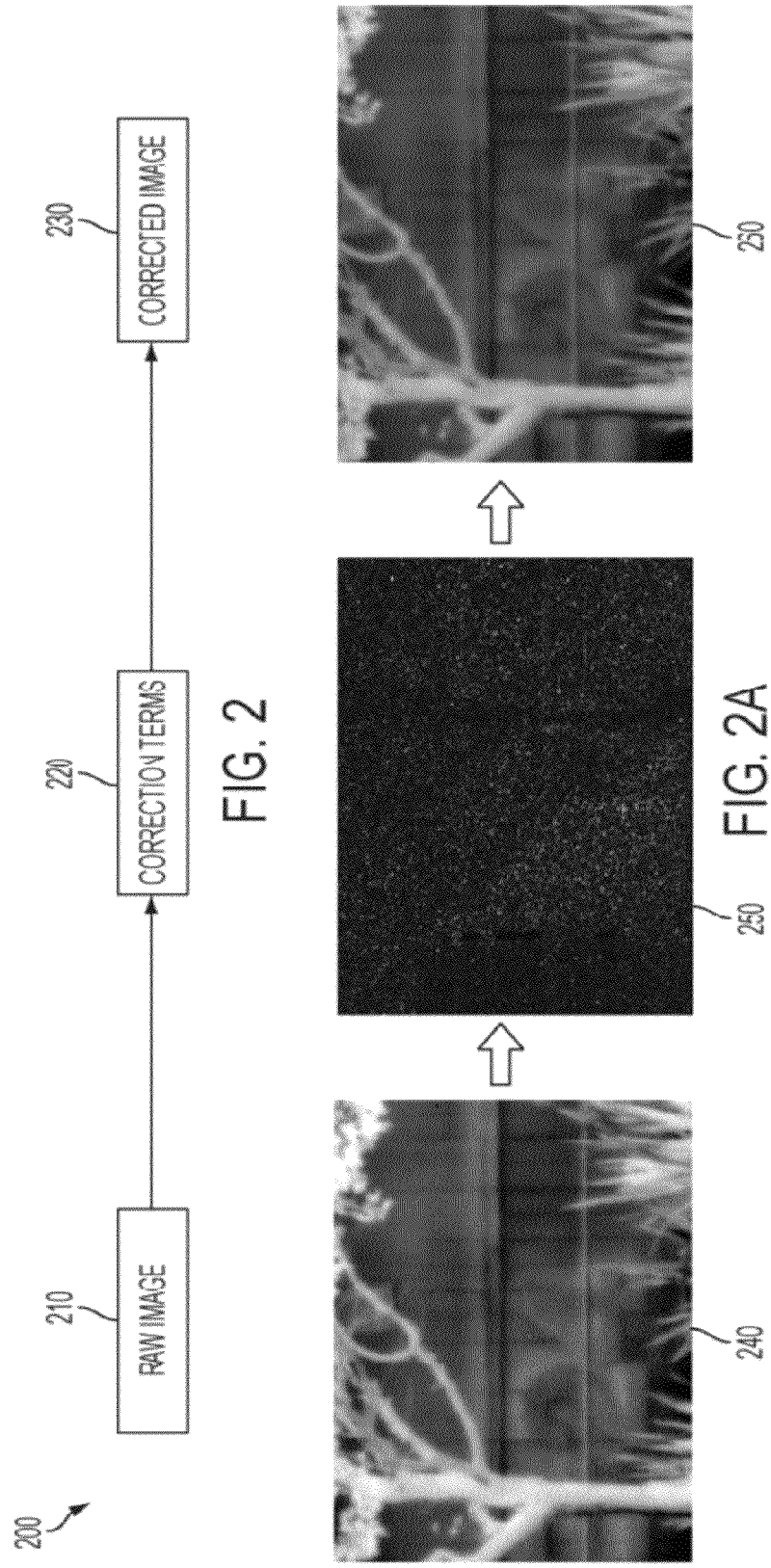

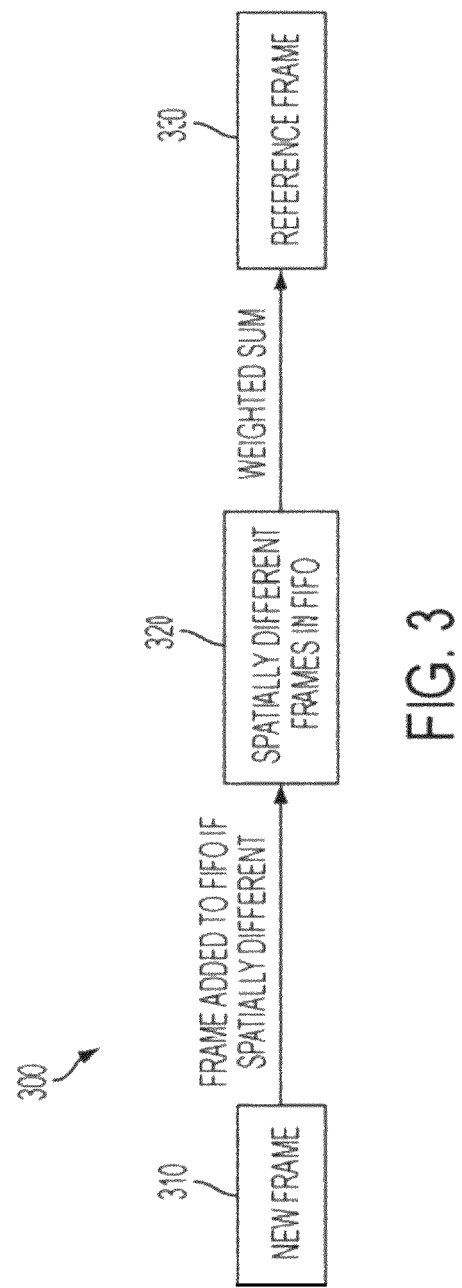

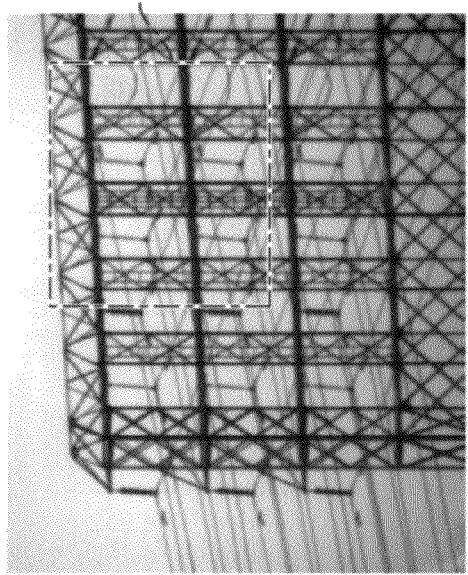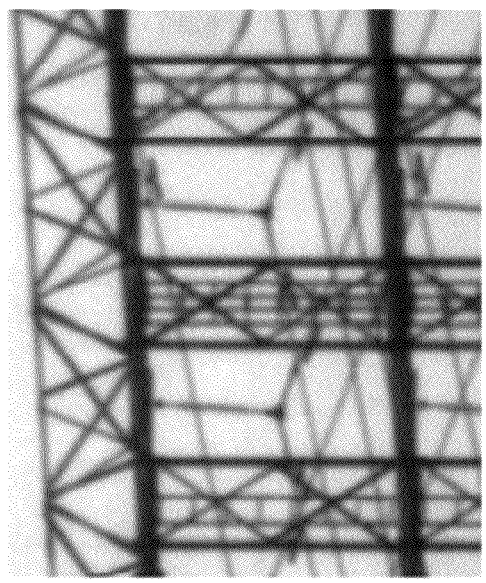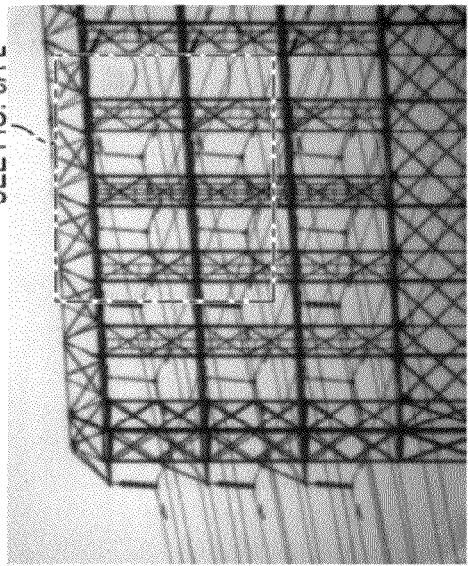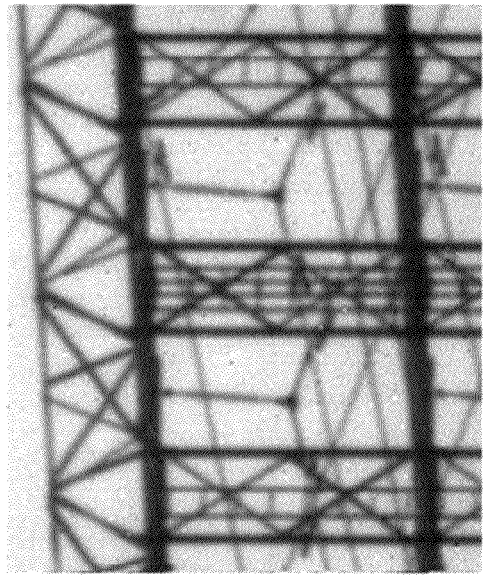

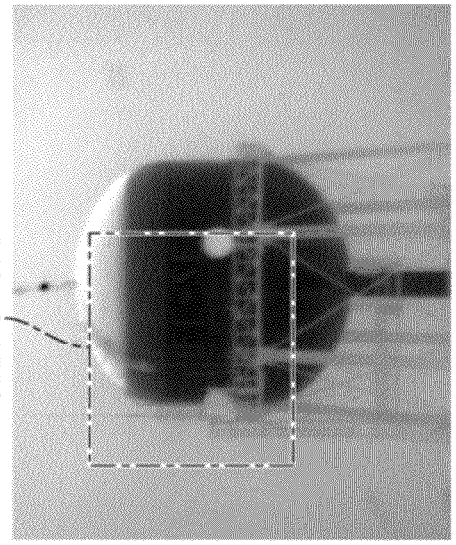
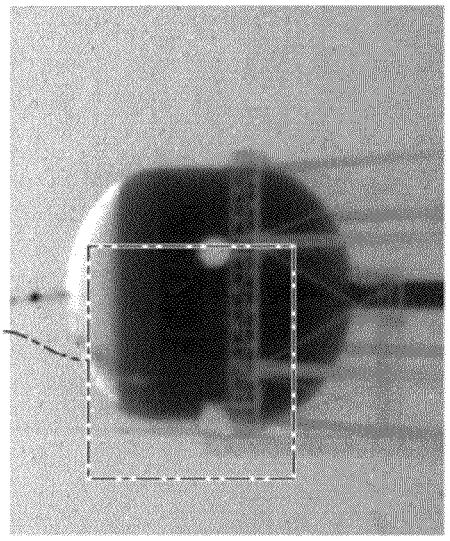
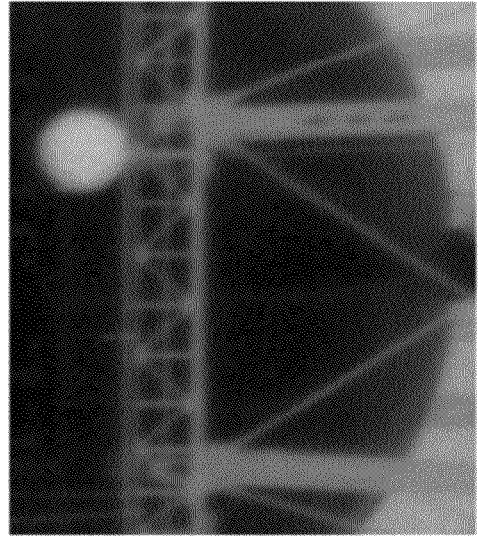
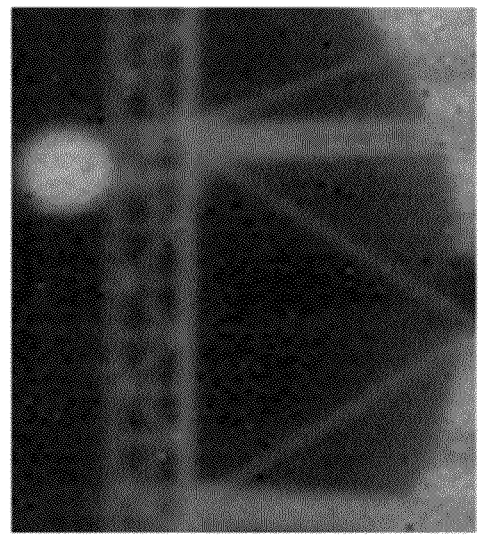

FIRST-IN-FIRST-OUT (FIFO) BUFFERED MEDIAN SCENE NON-UNIFORMITY CORRECTION METHOD

BACKGROUND

This application generally relates to digital image processing, and more particular, to a first-in-first-out (FIFO) buffered median scene non-uniformity correction method.

Digital sensors exhibit certain noise characteristics that result in some degree of image degradation in the final output. One image degradation problem of concern is residual Fixed Pattern Noise (FPN) which may be present after typical Non-Uniformity Correction algorithms have been performed. Distinguishing and effectively removing this noise traditionally has been difficult without degrading the high frequency spatial content of the image.

Conventional non-uniformity correction (NUC) methods have attempted to identify high frequency scene content areas and avoid further processing in those areas in a given frame. These methods converge slowly to minimize the effect of temporal noise and scene content impacting FPN correcting terms. Rapid changes in input scene intensity thus result in correspondingly rapid changes in FPN, which are not fully corrected. An additional problem with these approaches is that outlying pixels may be difficult to distinguish from high frequency content and, as a result, residual FPN artifacts can be present in an image. These artifacts may look like random "spots", "lines" and/or other visible artifacts to the end-user.

Thus, an improved scene non-uniformity correction method is desired which preserves the true image spatial context while removing noise.

SUMMARY

In an embodiment, a buffered scene-based non-uniformity correction method comprises: receiving a plurality of frames of video image data from an image detector; determining relative movement of a current image frame with respect to a previous image frame; if there is substantial movement determined, adding the current image frame to a buffer in a memory sized to store a predetermined number of video frames; averaging pixel values of the frames in the buffer to determine a mean value for each pixel of a reference image; determining correction terms for each pixel of the current image frame by determining the difference between the current image frame pixel value and the reference image; and correcting the current image frame using the correction terms.

In another embodiment, a buffered scene-based non-uniformity correction system comprises: a buffer memory sized to store a predetermined number of video frames; and a processor configured to: receive a plurality of frames of video image data from an image detector; determine relative movement of a current image frame with respect to a previous image frame; if there is substantial movement determined, add the current image frame to the buffer; average pixel values of the frames in the buffer to determine a mean value for each pixel of a reference image; determine correction terms for each pixel of the current image frame by determining the difference between the current image frame pixel value and the reference image; and correct the current image frame using the correction terms.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIG. 2A shows an example of the correction method being applied to a frame of video data.

FIG. 3 shows a general overview of a method for determining reference frames that may be used in the FIFO buffered median scene non-uniformity correction method in accordance with an embodiment.

FIGS. 7-10 show exemplary video frames both before and after having been subjected to FIFO buffered median scene non-uniformity correction method in accordance with an embodiment.

DETAILED DESCRIPTION

A first-in-first-out (FIFO) buffered median scene non-uniformity correction methodology is described which uses an algorithm that is configured to detect and to remove scene based non-uniformities from video images. The methodology is configured to preserve true image spatial content of the video images, while correcting for fixed pattern noise (FPN) therein. According to one or more embodiments, a FIFO buffer is used to store recent video images, with video frames being added only to the FIFO buffer when a minimum amount of spatial movement is detected. Weighted averaged FIFO buffer frames may be used to create a reference frame which is used to determine correction terms which are then used to correct image frames.

As used herein, "first-in-first-out" and "FIFO" refer to the prioritization and ordering of data in a queue having a predetermined size which can only accommodate a predetermined amount of data, in this case video images or frames. For instance, data added to the tail of the queue will continually be advanced to the head of the queue, as newer data is added to the tail and older data is removed from head of the queue. That being said, newer data being added at the tail may be thought of as pushing out older data from the head of queue.

Figure 1:
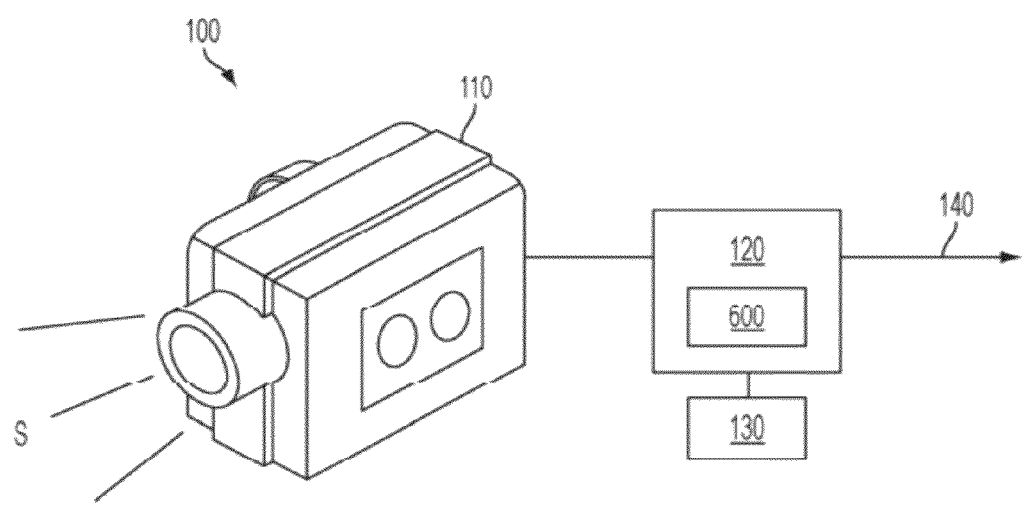
FIG. 1 shows a general overview of a FIFO buffered median scene non-uniformity correction system in accordance with an embodiment.

FIG. 1 shows a general overview of FIFO buffered median scene non-uniformity correction system 100 in accordance with an embodiment.

System 100 generally includes image detector 110, image processor 120, and FIFO buffer 130. Processed video image data 140 from image processor 120 may be output for display on a suitable display device and/or stored in memory (for later use).

Image detector 110 may be configured to generate video image data of scene S. For instance, in some implementations, image detector 110 may be a conventional video camera. It will be appreciated, though, that image detector 110 may be any device configured to receive electromagnetic energy (light) in one or more spectra, such as, for instance, ultraviolet (UV), visible (VIS) and/or infrared (IR) from scene S and to generate a plurality of consecutive images in relatively rapid succession. Together the images form video data.

Image processor 120 receives video image data from image detector 110 and processes individual frames of the video image data. In particular, image processor 120 is configured to perform a FIFO median scene non-uniformity correction to the video image data to correct for residual Fixed Pattern Noise (FPN) as disclosed herein. In various embodiments, image processor 120 may include dedicated hardware (such as, microprocessor, central processing unit (CPU), an application specific integrated circuit (ASIC) or field programmable gate array (FPGA)), software (or firmware), or a combination of dedicated hardware and software. Of course, it will be appreciated that any number of hardware and/or software implementations, programming languages, and operating platforms may be used. As such, the description or recitation of any specific hardware or software implementation, programming language, and operating platform herein is exemplary only and should not be viewed as limiting. For the different applications of the embodiments disclosed herein, the programming and/or configuration may vary. Processor 120 may be also integrated within any machine (not shown) in some cases. Also, while processor 120 is illustrated as being connected to image detector 110, it will be appreciated that processor 120 may be integrated into image detector 110, or alternatively be remote to it (with data being transferred, for instance, via one or more networks). Of course, video data may also be stored in an electronic memory and retrieved later for processing via processor 120.

Algorithm 600 (FIG. 6) may be stored on a computer- or machine-readable storage media having computer- or machine-executable instructions that are executable by processor 120. In one implementation, algorithm 600 may reside on a memory, such as, for example, any non-volatile electronic memory device (e.g., flash memory, EEPROM, etc.) or other memory device (e.g., disk drive, writable optical disk, etc.).

FIFO buffer 130 is configured to store plural frames of video data for use by image processor 120, which are used to perform image correction. FIFO buffer 130 may include any electronic memory device, for example, any non-volatile electronic memory device (e.g., flash memory, EEPROM, etc.) or other memory device (e.g., disk drive, writable optical disk, etc.) for storing video data. In one implementation, FIFO 130 buffer may be configured to store five frames of video data. Of course, FIFO buffer 130 might be smaller or larger depending on available memory and/or processing resources.

Figures 1, 7A:
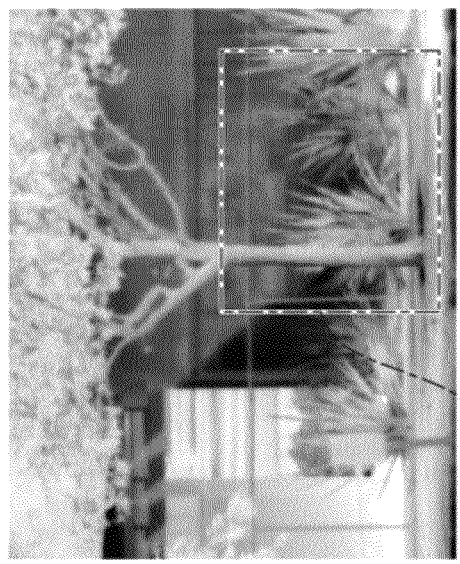
Figures 2, 7A:
FIG. 2 shows a general overview of a FIFO buffered median scene non-uniformity correction method in accordance with an embodiment.
Figures 1, 7B:
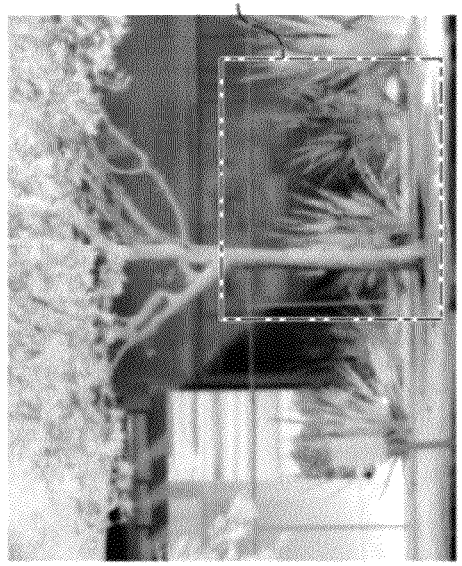
Figures 2, 7B:
Figures 2, 8B:
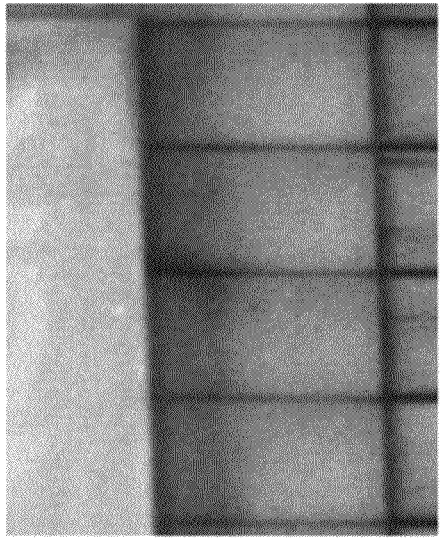
Figures 1, 8B:
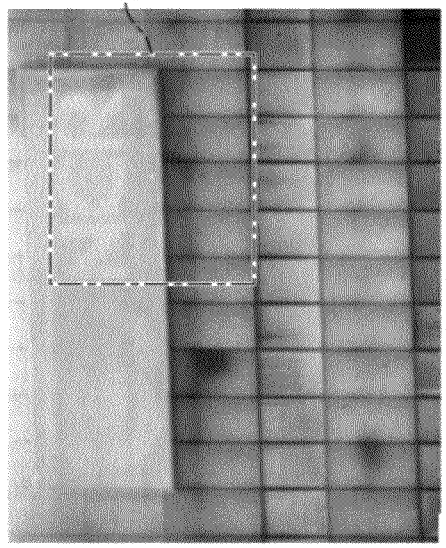
Figures 2, 8A:
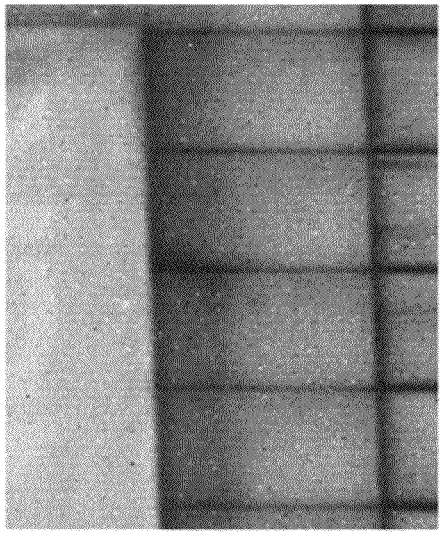
Figures 1, 8A:
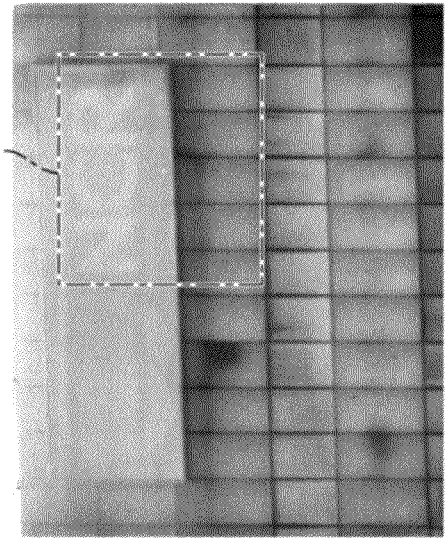

FIG. 2 shows a general overview of FIFO buffered median scene non-uniformity correction method 200 in accordance with an embodiment. FIG. 2A shows an example of the correction method 200 being applied to a frame of video data.

In step 210, raw video image data is provided from image detector 110 to image processor 120. The raw image data may include individual frames of video data in various analog and/or digital video formats, such as, for example, raw digital frames of video from image detector 110 in either progressive or interlaced formats, either sent as complete frame or as lines of video. Exemplary raw video image frame 240 is shown in FIG. 2A.

Next, in step 220, image processor 120 calculates correction terms for the raw image data using a FIFO buffered median scene non-uniformity correction method in accordance with one or more embodiments. Correction terms may be determined and individually applied on a pixel-by-pixel basis. Taken together, the correction terms may be referred to as a "blurry" reference frame, and may be generated using a FIFO buffer (of which may contain frames of video with a minimum spatial difference—relative scene movement) as discussed below. The correction terms are quickly updated by using a small FIFO buffer (e.g., five frames). Blurry reference frame 250 is shown in FIG. 2A. High spatial frequencies due to scene content are not present in blurry reference frame 250. As a result, the method used to generate correction terms does not produce terms that contain information on scene content and thus only remove FPN (and do not reduce spatial frequencies in the image due to genuine scene content).

To detect and remove residual FPN, processor 120 may be configured to look at an average of the frame values in FIFO buffer 130 for each pixel. In some implementations, this may be a weighted average. Motion detection is used to ensure that frames in FIFO buffer 130 are spatially different.

The difference between a given pixel value (in the averaged FIFO buffer 130) and the median of its nearest neighbors may be considered a good approximation of the FPN for that pixel. This difference represents the amount of offset needed to correct the FPN for this pixel in the image. FPN correction terms can be routinely updated when FIFO buffer 130 changes as a new frame replaces an older frame.

Next, in step 230, the correction terms calculated in step 120 are applied to the raw image data to generate a corrected video image. Corrected video frame 260 is shown in FIG. 2A. Additional image processing on the corrected video frames may also be performed (as necessary).

Method 200 may be configured, in some instances, not to update correction terms in areas of high-frequency and/or dynamic-range scene content. This may prevent improper correction terms from being created. Once the high-frequency and/or dynamic-range scene content moves to a different region, the correction terms for that region may again be regularly updated. However, this is not generally active for the vast majority of scene content and may prevent regions with high pixel-to-pixel differences from becoming a problem. Examples of scenes with high "delta" values, i.e., large differences in pixel intensities, can include an airplane engine, sky to hot object border, etc.

For determining motion, an image motion tracker may be used. And, for some image scenes, method 200 may be more aggressively performed, based on motion and/or other factors. Moreover, the method 200 may allow greater refinement of correction terms while viewing uniform scenes.

FIG. 3 shows a general overview of method 300 for determining reference frames that may be used in FIFO buffered median scene non-uniformity correction method 100 in accordance with an embodiment.

Method 300 uses FIFO buffer 130 to store recent video frames. Each new frame of video image data from image detector 110 is analyzed by image processor 120 in step 310. If the current frame under consideration is determined by image processor 120 to be spatially different than the previous frame in the video steam, then that frame will be added to FIFO buffer 130 in step 320.

A motion detection technique, for instance, can be used to ensure that frames in FIFO buffer 130 are spatially different, that is, having greater spatial variance than a predetermined minimum threshold, as discussed herein. In one instance, the predetermined minimum threshold may be 3 pixels having movement since the last moving frame detected.

According to one or more implementations, frames may also be added to FIFO buffer 130 when (i) there is a uniform scene with low spatial frequency content; and/or (ii) there was continuous motion which has recently stopped.

For the frames stored in FIFO buffer 130, an average sum is routinely computed by image processor 120 on a pixel-by-pixel basis, which together are used to form a reference frame in step 330. The reference frame may be configured to blur scene content, but not FPN. For instance, in one embodiment, the frames stored in FIFO buffer 130 may be processed so as to create a "blur" radius sufficient to remove the high spatial frequencies of the imaged scene but not the sensor FPN.

Figure 6:
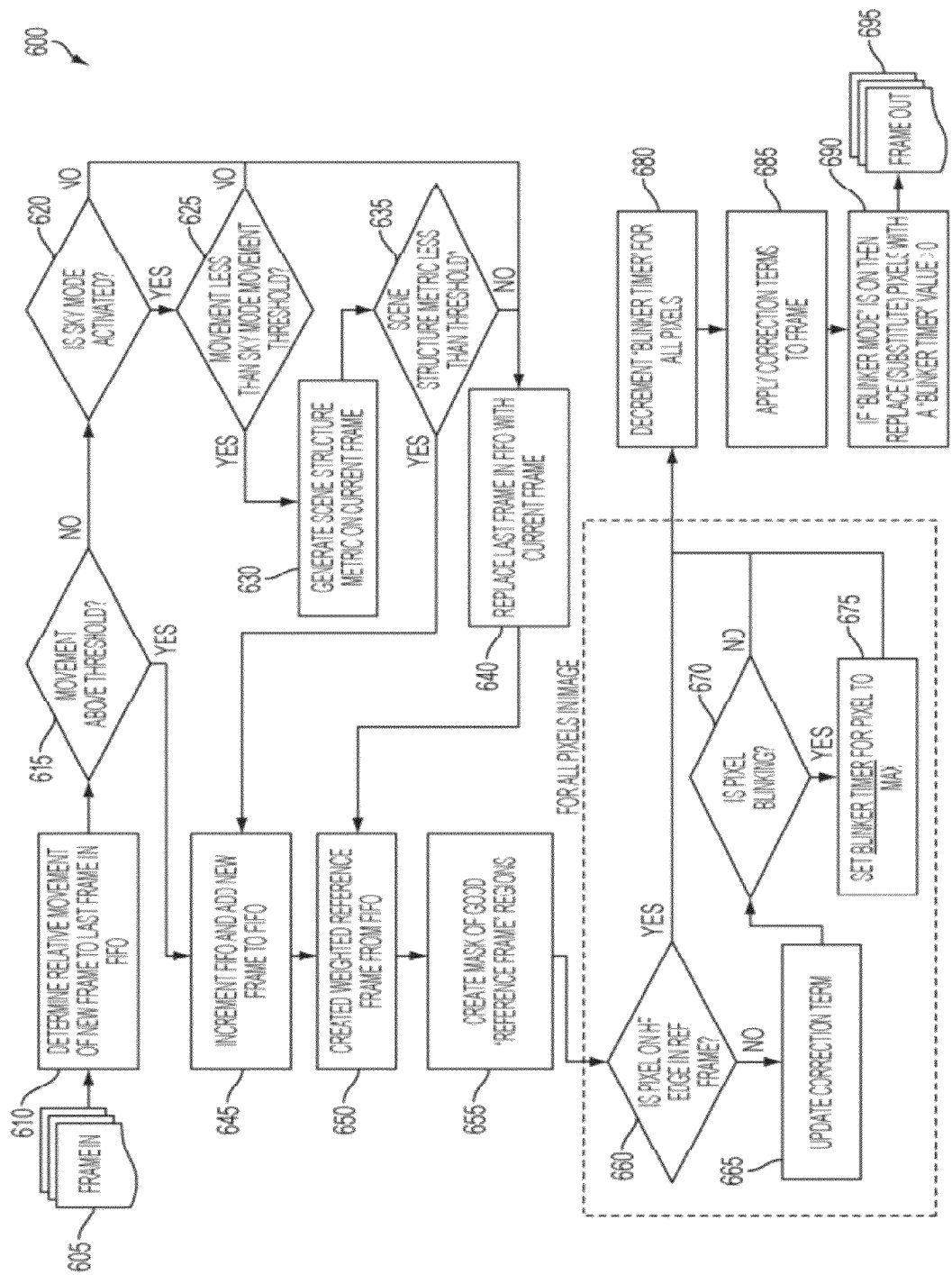
FIG. 6 shows an exemplary FIFO buffered median scene non-uniformity correction algorithm in accordance with an embodiment.

FIFO buffer 130 is heavily used in algorithm 600 (FIG. 6). The FIFO average is used to compute the FPN correction terms. FPN can be identified in all portions of the image (including areas of scene S with high spatial frequencies) since the "blurry" reference frame is used to detect FPN.

In one implementation, correction terms for FPN may be continuously evaluated and updated by image processor 120, for instance, at approximately 30 frames per second (fps). Thus, for a 5-frame FIFO buffer, the correction would be about 16.6 ms which enables handling of rapidly changing FPN levels. Recovery from any "negative" effect can be very quick and limited in duration to only about 16.6 ms. For example, large direct current (DC) offset pixels in the raw image (which appear as FPN in the reference frame) can then be corrected.

According to this methodology, the temporal noise in the reference frame (as compared to a single frame) may be reduced by approximately the square root of n, where n is the number of frames stored in FIFO buffer 130. This allows FPN to be more precisely quantified and corrected.

One or more optional modes may be provided in handling video image data.

In some cases, image motion detection may not be able to easily detect movement while viewing a uniform scene, such as the sky. Thus, an optional "Sky Mode" may be provided which is configured to determine if the video contains a uniform scene. The "Sky Mode" can be activated, for instance, when low scene structure is detected (i.e., no high spatial frequency content) and no motion is occurring. One low scene structure threshold may be determined applying a median filter to the image (kernel size in one implementation is 3×3 pixels), then convolving a two axis sobel kernel on a video frame, next generating the resulting sobel image, and finally determining the value of this resultant image. In one implementation a value of 350 can be used as a minimum threshold to determine the presence of low scene structure. No motion in one implementation may be considered when less than one-half pixel of motion is present. When this mode is activated (low scene threshold is met and no motion is present), frames may be added to the FIFO buffer to improve the calculation of correction terms. This optional processing allows scenes with very low contrast and scene structure to have residual FPN removed where conventional algorithms would not. In some implementations, the algorithm can run the FPN correction updates during a uniform scene. One or more tests (e.g., image scene structure, movement, etc.) may be performed to automatically prevent this mode from running, if any high frequency content exists. One scene structure metric is discussed in more detail below in step 630 (FIG. 6). When the Sky Mode is activated, though, the algorithm can add additional frames to the FIFO buffer and improve the correction terms.

Additionally, in some embodiments, an option may be selected to address stopped motion. For example, when there has been continuous movement that abruptly stops in the current frame, several additional frames (e.g., up to 50% of the FIFO buffer) may be added to the FIFO buffer. If this option is enabled, this allows the FIFO buffer to more accurately reflect current scene values, but to still contain sufficient blur. The end result of this optional processing is that Image Quality (IQ) in substantially static or non-motion conditions can be improved.

Another option may be to identify and remove blinking pixels from the video frames. One criterion to detect blinking pixels is to determine if a particular pixel changes quickly in time, but its neighboring pixels do not. To help detect blinking pixels, the algorithm looks at the change in the correction terms from one instance to the next. One of several strong indicators (metrics) that may indicate that the pixel is a "blinker," is if a correction term radically changes values (e.g. from one update of the correction term to the next). As a result of detecting a blinking pixel, the detected blinking pixels can be removed, and replaced with, for example, a median value of its neighbors. Thus, blinking pixels may be identified and removed substantially in real-time. In some instances, the algorithm may be configured to remove a few hundred blinking pixels in an image (e.g., less than 0.1% of the total pixels).

Figure 4:
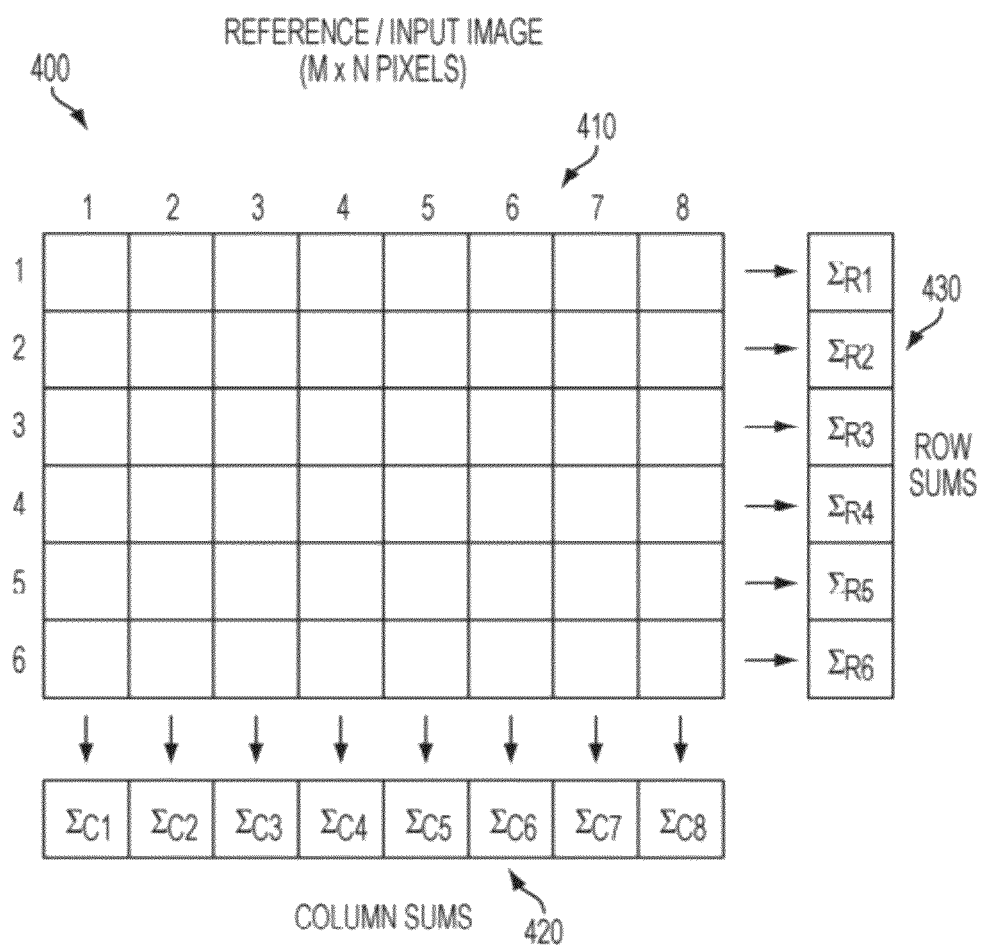
FIG. 4 shows an exemplary method for determining relative movement of a new frame to a previous frame of video data in the FIFO buffer according to an embodiment.

FIG. 4 shows exemplary method 400 for determining relative moment of a new frame to a previous frame of video data in the FIFO buffer according to an embodiment.

For determining motion, an image motion tracking function may be used. This ensures that high frequency spatial frequencies due to scene content are not present in the blurry reference frame. For some image scenes, this method may be more aggressively performed so as to allow greater refinement of correction terms while viewing uniform scenes.

Exemplary reference image 410 is schematically illustrated as an 8×6 array of pixels, for explanation purposes only. Of course, the size of an image is not limiting and may vary.

Method 400 correlates the X- and Y-axis sums of pixel values which reduces the number of operations by a factor of a square root of the number of pixels compared to most image correlation trackers. The result is a very fast, accurate tracking method with high temporal noise suppression. In addition, there may also be one or more error checking schemes built in to improve results and accuracy.

To begin, row vector 420 and column vector 430 corresponding to the size of the image 410 dimensions may be allocated in memory. Next, row and column vector sums Σ may be computed while reading in video data. For instance, as each pixel of image 410 is read in a line of video, its value may be added to the corresponding element value of row vector 420. When the end of the line of video is reached, the "row sum" $\Sigma_R$ is determined for that row and may be stored in the corresponding element of the row vector 420 for that particular row. The "column sum" $\Sigma_C$ may be calculated in an analogous manner as the row sums $\Sigma_R$.

Once computed, these vectors are compared with a previous frame (or other frame) to determine any potential correlation. To improve algorithm speed, the size of the correlation region or search size may be reduced. Also, by extending the correlation region, local regional movements versus entire image shifts may be found.

In some implementations, the resulting row and column vectors 420, 430 may be scaled to allow for sub-pixel correlation. For instance, a cubic interpolation function may be optionally applied to scale the size of the resulting vectors by a scaling factor Z. In one embodiment, the scaling factor Z may be 2. Although, it will be appreciated that values between 2 and 4 may be most common. Of course, other interpolation functions may also be used.

Consider, for example, an image size of M×N, where M is the number or rows and N is the number of columns. A search size D from a current pixel may be defined as the maximum distance (in pixels) to search for correlation/movement. If scaled, M, N and D will be each multiplied by the scale factor Z.

To determine the search size D for the image, the first step may be to take a segment of the reference scaled vector centered, of size $M*Z-N*Z-1$. Next, a segment of equal length (but indexed from the first index position of the comparative vector) is considered. The vectors can be compared using, for instance, a mean absolute difference method in which all corresponding elements in the vectors are subtracted, absolute value taken, and averaged. This metric is then recorded.

This process may be then repeated, but with the comparative vector starting at a next position (e.g., index position two). Again, the metric is recorded. This process is continued until the comparative sub-vector has considered the entire comparative vector and metrics for each position have been computed. There should be $2*D*Z+1$ iterations of the loop. Once completed, the minimum value of the vector (in the case of a mean absolute different metric being used) may correspond to the "best" correlation. The "offset" applied (i.e., index offset within search range) indicates the movement in pixels that was detected. If scaled, the resultant value may be divided by Z to get the proper correlation in the original image dimensions.

Figures 5A, 5B:
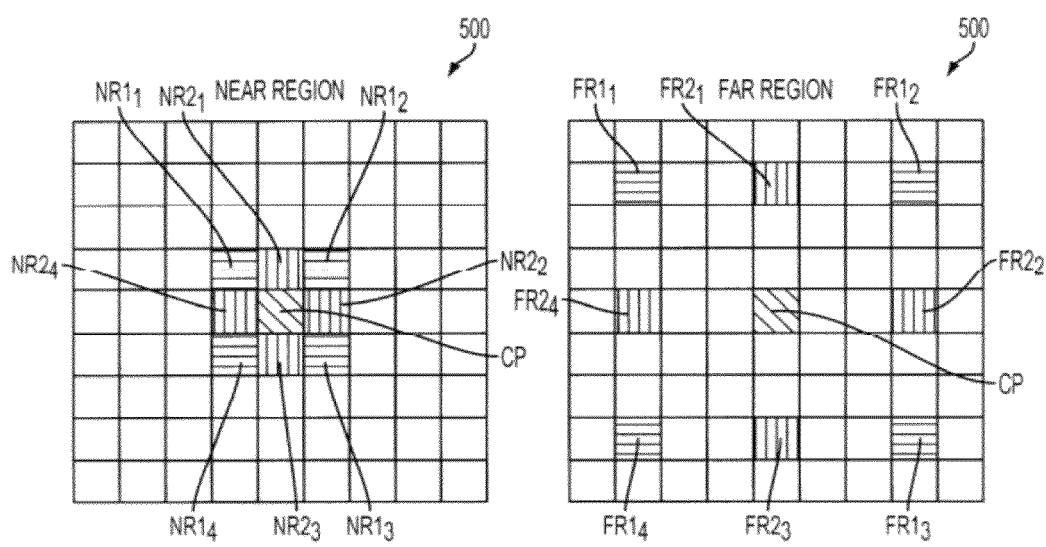
FIGS. 5A and 5B depict exemplary context windows for determining correction term values according to an embodiment.

FIGS. 5A and 5B depict exemplary context windows for determining correction term values according to an embodiment.

Each pixel in the reference frame may be individually processed to determine updated correction terms. Correction terms may be calculated using context windows in the vicinity of a pixel under consideration. For instance, the vicinity be may defined as plus or minus a few pixels (e.g., up/down and left/right) from the pixel under consideration. The process may require very little in the terms of memory resources.

Both a "near region" and "far region" from a current pixel under consideration may be defined. The near and far regions may each include eight pixels. Each of the near region and the far region may be further divided into two sub-regions (e.g., 1 and 2), which each contain four pixels. The first region may include the four pixels orthogonally oriented up/down and left/right with respect to the pixel under consideration. The second region may include the four pixels which are diagonally oriented with respect to the pixel under consideration.

FIG. 5A shows context window 510 for determining the near region (NR) median value. The NR median value may be determined by calculating the median of the "near region" around each pixel adjacent to the pixel under consideration in the reference frame. In this example, centrally located pixel CP is the pixel under consideration in context window 510. The near region is illustrated as the eight pixels $NR1_1$, $NR1_2$, $NR1_3$, $NR1_4$, $NR2_1$, $NR2_2$, $NR2_3$, $NR2_4$ immediately surrounding central pixel CP under consideration.

FIG. 5B shows context window 520 for determining the far region (FR) median value. The FR median value may be determined by calculating the median of the "outer edge region" around each pixel under consideration in the reference frame. In this example, centrally located pixel CP is the pixel under consideration. The outer edge region is illustrated as the eight pixels $FR1_1$, $FR1_2$, $FR1_3$, $FR1_4$, $FR2_1$, $FR2_2$, $FR2_3$, $FR2_4$ surrounding central pixel CP under consideration. As shown, outer edge pixels are located three pixels away up/down and left/right from the pixel under consideration.

For each sub-region, the four pixel values may be stored as a vector. The vector may be ordered to ensure that the first and last elements are the highest and lowest values and the center two values are averaged (i.e., taking the median of the four values). This results in:

Near Region 1 Median=Median ($NR1_1$, $NR1_2$, $NR1_3$, $NR1_4$)

Near Region 2 Median=Median ($NR2_1$, $NR2_2$, $NR2_3$, $NR2_4$)

Far Region 1 Median=Median ($FR1_1$, $FR1_2$, $FR1_3$, $FR1_4$)

Far Region 2 Median=Median ($FR1_1$, $FR1_2$, $FR1_3$, $FR1_4$)

Near Region Avg Median=(Near Region 1 Median+Near Region 2 Median)/2

Far Region Avg Median=(Far Region 1 Median+Far Region 2 Median)/2

Additionally, the absolute "delta" (or difference) of the center two values (of four) for the NR is calculated. This yields, Near Region 1 Center Value Delta and Near Region 2 Center Value Delta.

Updated correction terms may be determined using the NR and FR median values. The correction value can be determined by looking at the difference between the FIFO buffer average pixel value and the Near Region median pixel values. A weight, coef_update_weight, may be used to apply more or less emphasis on the new value. For instance, the NR may receive a two-thirds weighting and the FR receiving a one-third weighting. For each pixel, the correction term can then be computed using the following pseudo-code logic:

```
correction_last = correction[current_pixel]
GIVEN:
Threshold → Edge detection threshold value
Inner_Outer_Median_Thresh → Edge detection threshold value
coef_update_weight → Weight to update new correction term by
stack_avg → FIFO stack average
correction_old = correction[current_pixel]
IF
Near Region 1 Center Value Delta < Threshold
And
Near Region 2 Center Value Delta < Threshold
And
Abs(Near Region 1 Center Value Delta – Far Region Avg Median) <
Inner_Outer_Median_Thresh
THEN
    correction[current_pixel] =
    (
    coef_update_weight *
    ( stack_avg[current_pixel] – (Near Region 2 Median/1.5 + Near
Region 1 Median/3) )
    + correction[current_pixel]
    )
    /
    (1+coef_update_weight)
ELSE
    correction[current_pixel] = correction[current_pixel]
outer_mean_old[current_pixel] = Far Region Avg Median
```

The FIFO Average, stack_avg, can be calculated substantially simultaneously (i.e., "on the fly") as the most recent frame is being added. If, in a real-time scenario, any of the "conditionals" were met with the previous frame, then the FIFO Average might also be recomputed for each pixel as it is read in (although this may require a large amount of memory to store all the frames in the FIFO buffer). Using this method of computing FIFO Averages on the fly for the most recent frame can also (with a few video lines delay) compute correction terms without having to wait for the entire image to be read in. This allows the correction terms to be computed and applied with only a few lines of video delay to the system.

To compute correction terms, a delay of roughly three lines of video may be necessary before computing terms. This delay is directly proportional to the largest "kernel" size used in the correction terms (thus for a 7×7 kernel, the center of the kernel would require a three pixel clock delay plus three video line delay). To support a near-real time implementation, the correction terms may be computed by this amount of delay versus the "FIFO Average" being calculated for the given frame.

If the blinking pixel option is activated, blinking pixels may be identified and corrected at this time. For instance, the pseudo-code below can be invoked directly after the correction term for a pixel is calculated. It assumes the same precomputed variables that the correction term calculations needed have been generated. And, if the conditional statements are satisfied, then the blinker timer value for the pixel is set to the max value, e.g., 100 frames in one implementation.

```
GIVEN:
Near Region 1 → Already computed and sorted in Correction Term
Computation
Near Region 2 → Already computed and sorted in Correction Term
Computation
outer_mean → Already computed and sorted in Correction Term
Computation
outer_mean_old → Already computed and sorted in Correction Term
Computation
correction_old → Already computed and sorted in Correction Term
Computation
blinker_thresh, subterm_thresh → Threshold to help detect blinkers
blinker_time → Max Blinker Timer Value
main_pix_delta = correction[current_pixel] – correction_old
other_delta = outer_mean_old[current_pixel] – outer_mean
IF
    (abs(main_pix_delta) > blinker_thresh
    AND
    fabs(other_delta) < blinker_thresh_low
    AND max(Near Region 1) – min(Near Region 1) < subterm_thresh
    AND max(Near Region 2) – min(Near Region 1) < subterm_thresh
THEN
    blink_timer[current_pixel] = blinker_time
IF
    blink_timer[current_pixel] > 0
THEN
    blink_timer[current_pixel] = blink_timer[current_pixel] – 1
```

FIG. 6 shows exemplary FIFO buffered median scene non-uniformity correction algorithm 600 in accordance with an embodiment. Algorithm 600 may be executed by image processor 120 (FIG. 1). Algorithm 600 does not replace pixels due to non-uniformities, but rather corrects residual FPN. Merely replacing pixels can lead to image blur, which reduces Image Quality (IQ) and is generally not desirable.

Thus, to help high frequency scene content (and prevent correction terms from being inappropriately updated) algorithm 600 looks at several factors.

Algorithm 600 begins with current frame 605 of video data being considered. In step 610, the relative movement of current frame 605 is determined with respect to the previous frame. This may be performed by determining vectors for rows and columns respectively corresponding to the size of the image, for example, as discussed above, with respect to FIG. 4.

A determination is made in step 615 whether the determined movement is above a predetermined threshold. For instance, the predetermined threshold may be 3 pixels of scene movement since the last moving frame detected. Alternatively, this step might look to see if movement is within a certain number (e.g., one) of frames of movement falling below threshold.

If the determined movement is above a predetermined threshold then algorithm 600 continues to step 645, discussed below. Otherwise, algorithm 600 continues to step 620. In step 620 a determination is made whether the "Sky Mode" is activated. If the "Sky Mode" is not activated, then algorithm 600 proceeds to step 640.

If so, then in step 625, a further determination is made whether movement is less than the sky mode movement threshold. For instance, this may be 0.5 pixels relative movement. If so, then in step 630 a scene structure metric is generated on the current frame. Otherwise, if the sky mode movement threshold is not met, then the process proceeds to 640.

The scene structure metric generated in step 630 is configured to determine the structure of the scene. This results in a number that is proportional to scene content (with a higher value meaning more scene structure). The metric can be computed by taking the mean of all the resulting Net Sobel values. Sobel values may be computed using a known Sobel operator function.

First, the algorithm takes an incoming image and applies a median filter process to it. In one example, a 3×3 median filter may be used. Next, the image has both an X- and Y-axis Sobel operator kernel independently applied. The resulting value for each pixel is determined using the following formula:

$$\text{Net\_Sobel\_pix} = |X\text{Sobel\_pix}| + |Y\text{Sobel\_pix}|$$

The median filter removes very high frequency noise (such as, FPN/Temporal) that is generally not of any consequence, and then the Sobel works as an edge detection method.

In step 635, a determination is made whether the scene structure metric is less than a threshold value. For instance, this may be 77 (value is proportional to the degree of high spatial frequency content, with lower values indicating less high spatial frequencies) to ensure that the algorithm does not update correction terms in areas of high frequency or dynamic range scene content. If the scene structure metric is less than the threshold, then the processing continues to step 645. Otherwise, if the scene structure metric is not met, then the processing proceeds to 640.

In step 640, the last frame in the FIFO buffer is replaced with the current frame and the process continues to step 650. It will be appreciated that this step does not increment the FIFO buffer.

Returning to step 645, the FIFO buffer is incremented with a new frame being added to the FIFO buffer. In some implementations, the size of the FIFO buffer is five frames. In step 650, an average reference frame is created from the FIFO buffer. One way to create the reference frame is to average corresponding pixel values for all the frames within the FIFO buffer.

In step 655, a mask of good reference frame regions is created. The mask may be created by taking the difference of the maximum and minimum value of each pixel in the reference frame and determining if the difference in each pixel is less than a predetermined threshold, i.e., max (Ref. Frame (pixel)–min (Ref. Frame(pixel))<Threshold. This method may be used to determine cases where the scene intensity for a pixel is varying greatly across the frames in the FIFO. Ideally, the threshold may be set to call correction terms for each pixel "good" when the maximum minus minimum value for each pixel in the FIFO is below a threshold amount. Large variance for a pixel intensity for frames in the FIFO may potentially result in a poor correction term being applied. Thus, the mask is created to identify pixels that do not meet this condition and the correction term calculated can be applied. To do so, for instance, a threshold value may be set to 5% of the dynamic range of a pixel value.

For all pixels in an image, the process proceeds to step 660 in which a determination is made whether the current pixel is on a high frequency edge in the reference frame. To determine this, the difference of the Near Region Avg Median and the Far Region Avg Median is compared for each pixel in the reference frame. If the absolute value of the difference between these values is less than a threshold then an "edge" is detected. If this is the case, the process goes to step 680, discussed below. On the other hand, if this is not the case, the process proceeds to step 665, where a correction term is updated, for example, as discussed above, with respect to FIG. 5.

In step 670, another determination may be made whether the current pixel is a blinking pixel. Blinking pixel detection is an optional feature and may be implemented during the correction term computation. The purpose is to detect pixels that are varying in value quickly over time not due to scene change. To detect blinking pixels, the algorithm looks at the change in the correction terms from one instance to the next. If the correction term radically changes values (from one update of the correction term to the next) this may be one indication that the pixel is blinking.

Another check that may be performed makes sure that the correction terms of the surrounding neighbors (passed through a median process) also did not change quickly. If this is the case then it is likely not a blinking pixel and is a valid correction change. A final check may be performed to determine that the immediate surrounding pixels (that were passed through a median process) are relatively the same. If they are not the same, then this may indicate scene content and not a blinking pixel. If they are very close and the two above tests pass, then the pixel may be assumed to be a blinking pixel.

If not, the process goes to step 680, discussed below. For a blinking pixel, in step 675, a blinker timer for the pixel is set to its maximum value. For instance, this may be 100 frames of video.

Next, in step 680, the blinker timer is decremented for all pixels in the current frame. The blinker timer may be decreased each iteration by 1. In step 685, the correction terms are applied to the current frame. This may be accomplished by taking the difference between the reference frame and the product of the correction terms and the good mask reference, i.e., Frame−(correction_terms*good_ref mask). Continuing to step 690, if the "blinker mode" is activated then the pixels are replaced (or substituted) with pixels having a blinker timer value greater than zero. Processed frame 695 is output from process 600, and processing returns to step 610 for another frame 605 of video data.

Implementing using the above method is possible on many systems that operate on entire frames (images) at once. Many legacy systems, however, operate on individual video lines as they are read in. The above algorithm therefore may need to be modified slightly to conform to these system. For example, to modify the algorithm, several key items will now have a one frame "lag". Those items may be: Movement Analysis through Scene Structure Metric. The entire frame method allows in x (typically 2) frames extra into the FIFO buffer once movement has stopped. This number may need to decrease by one frame (to account for the lag). The scene structure method will not measurably affect performance if it is one frame behind. Given these changes, the rest of the algorithm will calculate the following with only three video lines of delay (e.g., determined by largest kernel size used in the algorithms).

FIGS. 7-10 show exemplary video frames both before and after having been subjected to a FIFO buffered median scene non-uniformity correction method in accordance with an embodiment. Portions of the frames have been magnified for clarity.

FIGS. 7A-10A show the raw videos frame prior to processing. The residual FPN appears in the raw image frame as random "spots", "lines" and/or other visible artifacts (indicated in the figures with small surrounding circles).

And, FIGS. 7B-10B show the same video frame after processing. As will be appreciated, the random "spots", "lines" and/or other visible artifacts visible in FIGS. 7-10 have generally been removed by the processing. FPN may be due to non-linear responsivity of pixels not being fully corrected by a conventional NUC methods. The FPN has been actively reduced, despite the presence of high frequency scene spatial frequencies.

Figure 11:
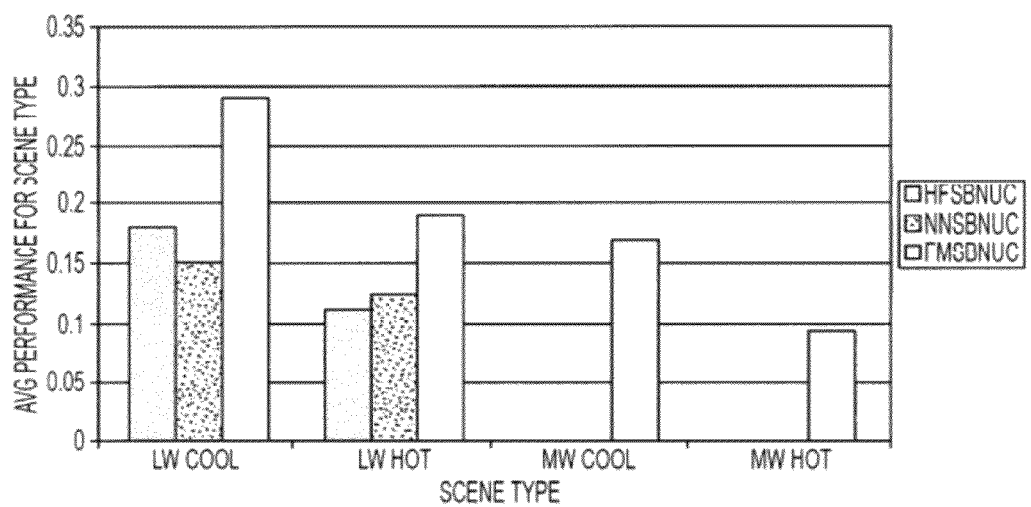
FIG. 11 is a plot showing performance of the FIFO-buffered median scene non-uniformity based correction algorithm in accordance with an embodiment as compared with other conventional non-uniformity correction algorithms.

FIG. 11 is a plot showing performance of the FIFO-buffered median scene based non-uniformity correction algorithm in accordance with an embodiment as compared with other conventional non-uniformity correction algorithms.

Conventional high-frequency scene based non-uniformity correction (HFSBNUC) and nearest neighbor scene based non-uniformity correction (NNSBNUC) algorithms were compared to a FIFO-buffered median scene based non-uniformity correction method (FMSBNUC) algorithm in accordance with an embodiment.

The evaluations were based on 31 "standard" video sets, including 16 long-wave infrared (LW IR) hot and cold scenes and 15 mid-wave infrared (MW IR) hot and cold scenes. The hot and cold scenes were measured at temperatures of approximately 0 and 40 degrees C., respectively. In general, evaluation scenes were chosen as to provide a large range of scene intensity values across the dynamic range of the imaging sensor used in test.

The FMSBNUC performance (reduction in FPN) was approximately 50-60% higher than that of the HFSBNUC and the NNSBNUC. In the plot, the higher the average performance level indicated a better improvement. In addition, there was a significant improvement in the measured errors for FMSBNUC. For HFSBNUC, there were 6 minor errors measured and no moderate errors. For NNSBNUC, there were 45 minor errors and 18 moderate errors. And, for FMSBNUC, there was one moderate error and no mirror errors. Both the HFSBNUC and the NNSBNUC has "zero" measured improvement for the MW IR scenes.

Advantages of the FIFO buffered median scene non-uniformity correction method, described above, include (i) removal of high spatial frequency FPN; (ii) handling both regions of high spatial frequency scene content and regions of uniform scene in images; (iii) removal of column amplifier DC offsets which may be relatively high in spatial frequency; and (iv) identifies and corrects blinking (and/or other noisy pixels). In one embodiment, the FIFO buffered median scene non-uniformity correction method never replaces pixels due to non-uniformities under any circumstances, and instead always tries to correct residual FPN By contrast, replacing pixels always causes image blur which reduces image quality and is not desired.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A buffered scene-based non-uniformity correction method comprising:
   receiving a plurality of frames of video image data from an image detector;
   determining relative movement of a current image frame with respect to a previous image frame;
   if there is substantial movement determined, adding the current image frame to a buffer in a memory sized to store a predetermined number of video frames;
   averaging pixel values of the frames in the buffer to determine a mean value for each pixel of a reference image;
   determining correction terms for each pixel of the current image frame by determining the difference between the current image frame pixel value and the reference image; and
   correcting the current image frame using the correction terms.

2. The method according to claim 1, wherein the buffer is a first-in-first-out (FIFO) buffer.

3. The method according to claim 1, wherein the buffer is configured to hold five frames of video.

4. The method according to claim 1, further comprising:
   responsive to a determination that the current frame includes a uniform scene with low spatial frequency content, adding the current image frame to the buffer.

5. The method according to claim 1, further comprising:
   responsive to a determination that there has been continuous motion in previous frames which has stopped in the current frame, adding one or more additional frames to the buffer corresponding to the current frame.

6. The method according to claim 1, further comprising:
   identifying and removing blinking pixels from the images.

7. The method according to claim 1, wherein determining correction term values for each pixel comprises:
   determining pixels in a near region to the current pixel;
   determining pixels in a far region to the current pixel; and
   analyzing the near and far region pixels.

8. The method according to claim 1, wherein determining relative movement of a current image frame with respect to the previous image frame comprises:
   determining row and column sum vectors for the current image from and the previous image frame; and
   analyzing the determined row and column sum vectors to determine a correlation between the current image frame and the previous image frame.

9. The method according to claim 8, wherein analyzing the determined row and column sum vectors comprises:
   searching for movement between the current image frame and the previous image frame within a predetermined distance from each current pixel.

10. The method according to claim 1, wherein regions in the current frame which have high-frequency or dynamic range scene content are not corrected.

11. The method according to claim 1, wherein the pixel values of the frames in the buffer are continuously averaged when new frames are added to the buffer.

12. The method according to claim 1, wherein the mean value is a weighted mean value.

13. A buffered scene-based non-uniformity correction system comprising:
   a buffer memory sized to store a predetermined number of video frames; and
   a processor configured to:
      receive a plurality of frames of video image data from an image detector;
      determine relative movement of a current image frame with respect to a previous image frame;
      if there is substantial movement determined, add the current image frame to the buffer;
      average pixel values of the frames in the buffer to determine a mean value for each pixel of a reference image;
      determine correction terms for each pixel of the current image frame by determining the difference between the current image frame pixel value and the reference image; and
      correct the current image frame using the correction terms.

14. The system according to claim 13, further comprising:
   a image detector configured to generated the video data.

15. The system according to claim 13, wherein the buffer is a first-in-first-out (FIFO) buffer.

16. The system according to claim 13, wherein the buffer is configured to hold five frames of video.

17. The system according to claim 13, wherein the processor is configured to:
   responsive to a determination that the current frame includes a uniform scene with low spatial frequency content, add the current image frame to the buffer.

18. The system according to claim 13, wherein the processor is configured to:
   responsive to a determination that there has been continuous motion in previous frames which has stopped in the current frame, add one or more additional frames to the buffer corresponding to the current frame.

19. The system according to claim 13, wherein the processor is configured to:
   Identify and remove blinking pixels from the images.

20. The system according to claim 13, wherein, in determining correction term values for each pixel, the processor is configured to:
   determine pixels in a near region to the current pixel;
   determine pixels in a far region to the current pixel; and
   analyze the near and far region pixels.

21. The system according to claim 13, wherein, in determining relative movement of a current image frame with respect to the previous image frame, the processor is configured to:
   determine row and column sum vectors for the current image from and the previous image frame; and
   analyze the determined row and column sum vectors to determine a correlation between the current image frame and the previous image frame.

22. The system according to claim 21, wherein, in analyzing the determined row and column sum vectors, the processor is configured to:
   search for movement between the current image frame and the previous image frame within a predetermined distance from each current pixel.

23. The system according to claim 13, wherein regions in the current frame which have high-frequency or dynamic range scene content are not corrected.

24. The system according to claim 13, wherein the pixel values of the frames in the buffer are continuously averaged when new frames are added to the buffer.

25. The system according to claim 13, wherein the mean value is a weighted mean value.

* * * * *